United States Patent
Chand et al.

(10) Patent No.: US 8,417,125 B2
(45) Date of Patent: Apr. 9, 2013

(54) FULL-DUPLEX LASER COMMUNICATION USING SINGLE WAVELENGTH FROM AN OPTICAL TRANSMITTER

(75) Inventors: Naresh Chand, Warren, NJ (US); Bruce Eteson, Hackettstown, NJ (US); Daniel Taskalos, Secaucus, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 357 days.

(21) Appl. No.: 12/789,679

(22) Filed: May 28, 2010

(65) Prior Publication Data

US 2010/0303466 A1 Dec. 2, 2010

Related U.S. Application Data

(60) Provisional application No. 61/183,330, filed on Jun. 2, 2009.

(51) Int. Cl.
*H04B 10/00* (2006.01)
(52) U.S. Cl. ......... 398/169; 398/119; 398/136; 398/170
(58) Field of Classification Search .................. 398/118, 398/119, 123, 124, 135–137, 169, 170
See application file for complete search history.

(56) References Cited

U.S. PATENT DOCUMENTS

| | | | | |
|---|---|---|---|---|
| 4,731,879 A | * | 3/1988 | Sepp et al. | 398/170 |
| 6,525,853 B1 | * | 2/2003 | Stuart | 398/115 |
| 6,778,779 B1 | | 8/2004 | Shay et al. | |
| 7,272,271 B2 | * | 9/2007 | Kaplan et al. | 385/3 |
| 8,027,591 B2 | * | 9/2011 | Maryfield | 398/170 |
| 2006/0291868 A1 | * | 12/2006 | Yee et al. | 398/152 |
| 2009/0202254 A1 | * | 8/2009 | Majumdar et al. | 398/140 |

OTHER PUBLICATIONS

T.M. Shay, J.A. MacCannell, C.D. Garrett, D.A. Hazzard, J.A. Payne, N. Dahlstrom, S.Horan, The First Experimental Demonstration of Full-Duplex Communications on a Single Laser Beam, Proc. of SPIE vol. 5160, 2004, pp. 265-271.

(Continued)

*Primary Examiner* — Dalzid Singh
(74) *Attorney, Agent, or Firm* — Sand & Sebolt; Rodney E. Haven; Daniel J. Long

(57) ABSTRACT

Methods, systems and other embodiments associated with a laser communication system using a single wavelength are presented. A first data is modulated onto an RF carrier to produce a modulated RF carrier. A laser is intensity modulated using with the modulated RF carrier. The intensity modulated laser beam is transmitted from an interrogator to a modulating retro-reflector (MRR) terminal. A portion of the laser beam is received at a receiver at the MRR terminal. Another portion of the laser is modulated at the MRR terminal with a second data to produce a re-modulated laser beam. The re-modulated laser beam is reflected back to the interrogator.

20 Claims, 5 Drawing Sheets

OTHER PUBLICATIONS

David Klotzkin, Peter G. Goetz, William S. Rabinovich, Mike S. Ferraro, Rita Mahon, Steven C. Binari, Integrated Angle-of-Arrival Sensing and Simultaneous Bidirectional Communication Using a Cat's Eye Modulating Retroreflector, OSA/CLEO/IQEC, 2009.

G. Charmaine Gilbreath, William S. Rabinovich, Rita Mahon, L. Swingen, Eun Oh, Timothy Meehan, and Peter Goetz, Real-Time 1550 nm Retromodulated Video Link, Proceedings of the 2003 IEEE Aerospace Conference, 2003, vol. 4, pp. 1791-1797.

W. S. Rabinovich, R. Mahon, P. G. Goetz, E. Waluschka, D. S. Katzer, S. C. Binari, and G. C. Gilbreath, A Cat's Eye Multiple Quantum-Well Modulating Retro-Reflector, IEEE Photonics Technology Letters, Mar. 2003, vol. 15, No. 3, pp. 461-463.

W. S. Rabinovich, R. Mahon, H. R. Burris, G. C. Gilbreath, P. G. Goetz, C. I. Moore, M. F. Stell, M. J. Vilcheck, J. L. Witkowsky, L. Swingen, M. R. Suite, E. Oh, J. Koplow, Free-Space Optical Communications Link At 1550 NM Using Multiple-Quantum-Well Modulating Retroreflectors in a Marine Environment, May 2005, Optical Engineering 44(5), 056001-1-056001-12.

\* cited by examiner

US 8,417,125 B2

FULL-DUPLEX LASER COMMUNICATION USING SINGLE WAVELENGTH FROM AN OPTICAL TRANSMITTER

CROSS REFERENCE TO RELATED APPLICATION

This application claims priority from U.S. Provisional Application Ser. No. 61/183,330, filed Jun. 2, 2009; the disclosure of which are incorporated herein by reference.

BACKGROUND OF THE INVENTION

1. Technical Field

The present invention relates generally to apparatus and systems for communicating between a transmitter and a receiver. More particularly, the apparatus and systems relate to transmitting and receiving data through optical wireless or free-space optical communication. Specifically, the apparatus and systems of the present invention transmit and receive data with a common laser transmitter.

2. Background Information

Free-space optical links (FSO) (also called lasercomm) offer high-bandwidth and jam-resistant communications with a low probability of intercept and detection (LPI/LPD) between tactical edge platforms and users. However, these links require large telescopes, lasers and highly accurate pointing, acquisition and tracking systems to work. But in some cases, one end of the link cannot accommodate the size, weight and power (SWAP) of a lasercomm terminal and has lower data requirements than a conventional lasercomm link. An FSO link may still be desirable because of LPI/LPD, large SWAP of RF terminals even for these low data rates, and RF spectrum allocation may be limited. In these situations, a modulating retro-reflector (MRR) link is appropriate. An MRR couples a passive retro-reflector such as a corner-cube or cat's eye with an electro-optic modulator such as multiple-quantum-well (MQM) modulator. As shown in FIG. 1, typically in an MRR link, a conventional, actively pointed, lasercomm terminal 104 (e.g., interrogator) on one end interrogates an MRR 102 on the other end of the link with a continuous wave (CW) laser beam 106. This beam 106 is passively retroreflected back to the interrogator as a retroreflected beam 108 with a data signal imposed on it by the modulator 102. The technique is appropriate for unattended sensors or disadvantaged users. The link falls of as (distance)$^{-4}$. Data rates of up to 10 Mbps is possible for corner cube retro-reflector and 10's Mbps for cat's eye retro-reflector.

Naval Research Laboratory (NRL) has been actively working for over a decade in developing MQW modulators and MRR links and they have disclosed their work in many journals and conference papers, for example: (i) G. Charmaine Gilbreath, William S. Rabinovich, Rita Mahon, L. Swingen, Fun Oh, Timothy Meehan, and Peter Goetz, "Real-Time 1550 nm Retromodulated Video Link", Proceedings of the 2003 IEEE Aerospace Conference, Paper No. 1560; (ii) W. S. Rabinovich, R. Mahon, P. G. Goetz, E. Waluschka, D. S. Katzer, S. C. Binari, and G. C. Gilbreath, "A Cat's Eye Multiple Quantum-Well Modulating Retro-Reflector, IEEE PHOTONICS TECHNOLOGY LETTERS, VOL. 15, pp. 461-63, 2003; and (iii) W. S. Rabinovich, R. Mahon, H. R. Burris, G. C. Gilbreath, P. G. Goetz, C. I. Moore, M. F. Stell, M. J. Vilcheck, J. L. Witkowsky, L. Swingen, M. R. Suite, E. Oh, and J. Kaplow, "Free-space optical communication link at 1550 nm using multiple-quantum-well modulating retro-reflectors in a marine environment" Optical engineering, Vol. 44, p. 056001-1, 2005, the contents of which are incorporated herein by reference. By their very nature as discussed above and shown in FIG. 1, MRR links are either half duplex or the data flows only from the MRR to the interrogator unless another optical wavelength from another transmitter is used to transmit data in the other direction, i.e., from the interrogator 104 to the MRR terminal 102. When data is transmitted in both directions at different wavelengths, an optical filtering will be needed at both ends in addition to another optical transmitter at the interrogator 104. This will increase the size weight and power (SWAP) and cost. A better FSO lasercomm system is needed.

BRIEF SUMMARY OF THE INVENTION

The preferred embodiment of the invention comprises a system with a modulating retro-reflector (MRR) terminal. The system also includes an interrogator terminal configured to modulate a laser signal based on a first data to produce a modulated optical signal carrying a digitally modulated radio frequency (RF) signal with the first data. The system forms a free-space optical link (FSO) between the interrogator and the MRR terminals. The interrogator can modulate the RF signal using a quadrature phase-shift keying (QPSK) or any other digital modulation technique. The interrogator intensity modulates a laser using the modulated RF signal to produce an intensity modulated laser beam. The interrogator then transmits the intensity modulated laser beam to the MRR.

The MRR terminal comprises two parts: (i) an optical receiver; and (ii) a modulating retro reflector (MRR). A part of the received light from the interrogator is forwarded toward the receiver and the rest toward the MRR. The optical receiver is configured to receive the intensity modulated laser beam and to decode it to extract the first data. Next, the MRR further modulates the received intensity modulated laser beam based on a second data in baseband and reflects it back to the interrogator. The interrogator is configured to receive and extract the second data from the doubly intensity modulated laser beam.

Another configuration of the preferred embodiment comprises a method of lasercomm using single wavelength of light. The method comprises modulating a first data onto an RF carrier to produce a digitally modulated RF carrier. The RF digital modulation can be a quadrature phase-shift keying (QPSK) with or without forward error correction (FCC). Next, the laser is intensity modulated with the digitally modulated RF carrier. The modulated laser beam is then transmitted from an interrogator to a modulating retro-reflector (MRR). The laser beam is received at the MRR terminal. Through optical techniques, a part of the received light, called the first part, is focused on a strategically located receiver, and the remaining light, called second part, is focused on the MRR. The electronics in the receiver decodes the signal to recover the first data. The second part is modulated with a second data to produce a re-modulated laser beam using an on-off keying (OOK) modulation technique. This re-modulated laser beam is then re-transmitted to the interrogator. The re-modulated laser beam is decoded at the interrogator to recover the second data.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE INVENTION

Figure 1:
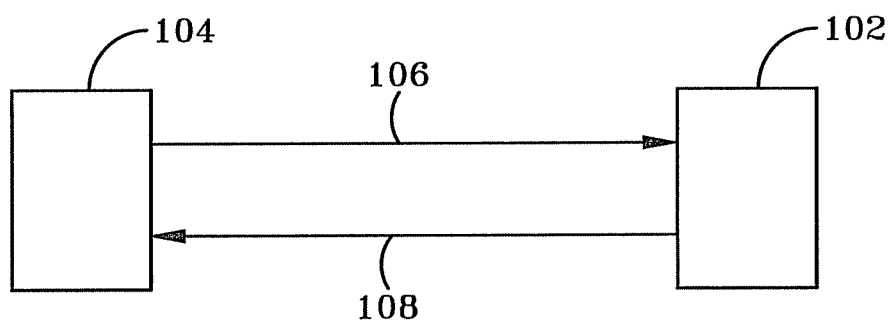
FIG. 1 is a schematic drawing showing a conventional modulating retro-reflector link.
Figure 2:
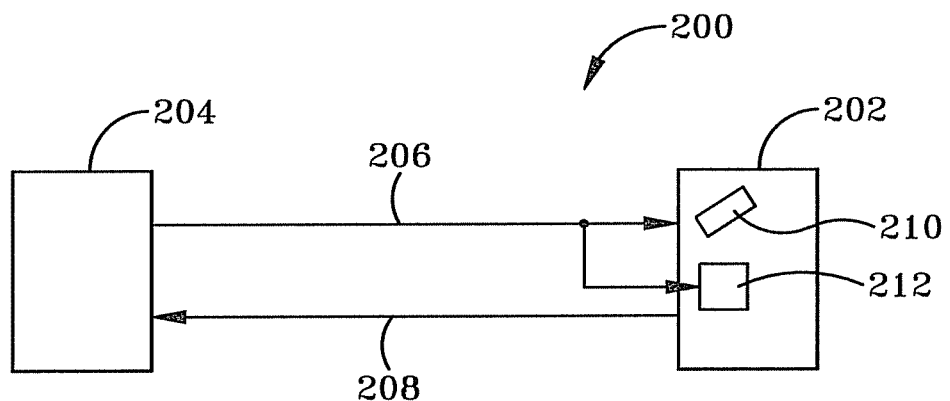
FIG. 2 is a schematic drawing showing a preferred embodiment of the full duplex optical link using a common laser source.

Referring to FIG. 2, the preferred embodiment is system 200 for a full duplex FSO link between a modulating retro-reflector (MRR) terminal 202 and an interrogator terminal 204 using one spectral wavelength. The MRR 202 terminal includes a receiver 210 and a modulating retro-reflector 212. The interrogator 204 is configured to modulate an RF signal based on a first data to produce a digitally modulated RF signal. The interrogator 204 is configured to intensity modulate a laser based on the modulated RF signal to produce an intensity modulated laser beam 206. The interrogator 204 can then transmit the intensity modulated laser beam 206 to the MRR 202.

The receiver 210 is configured to receive a portion of the intensity modulated laser beam 206, convert it to electrical signals and decode it to extract the first data. The MRR 212 also modulates the intensity modulated laser beam 206 based on a second data and reflects the re-modulated laser beam 208 back to the interrogator 204. The interrogator 204 can then extract the second data from the re-modulated laser beam 208. Both the transmitted and received beams 206, 208 respectively correspond to a single optical wavelength.

In further detail, the interrogator 204 can transmit digital baseband data with or without forward error correction overheads to MRR terminal 202 in digital passband. This can be done by modulating an RF carrier with the data to be transmitted using a digital modulation technique such as quadrature phase-shift keying (QPSK). The QPSK modulated RF signal can then intensity modulate a CW laser with a desired modulation index (m) which typically can be between 5 to 25% depending on the link conditions and desired signal to noise ratio per bit (Eb/No) on the received side at the MRR terminal. The CW laser can be a directly modulated fixed wavelength or a tunable laser to allow selection of an optimum A for the multi-quantum well (MQW) modulator 212 typically used at the MRR terminal. QPSK is very robust requiring very low Eb/No (10.5 dB without FEC) for error free transmission as compared to other modulations. QPSK is widely used for voice, data and video by satellites, Cable TV, 802.11b and other communications. However, normally most interrogator 204 and MRR 202 terminals can also have a parallel digital RF link and the same RF signal can be transmitted optically to avoid new RF hardware. The preferred embodiment modulates the RF signal with a QPSK modulation but other digital modulation techniques can be used at the cost of required higher Eb/No.

Part of the transmitted QPSK optical signal falls on the strategically located optical receiver 210 at the MRR terminal and the transmitted data is recovered. An MQW modulator 212 located in the MRR 202 terminal can re-modulate the QPSK modulated optical signal using on-off keying (OOK) and passively reflect it back to the interrogator 204. Typical extinction ratio (ER) of the MQW modulator is ~3 dB only, and so there can be a reduced or no power clipping or little if any noticeable power penalty.

Figure 3:
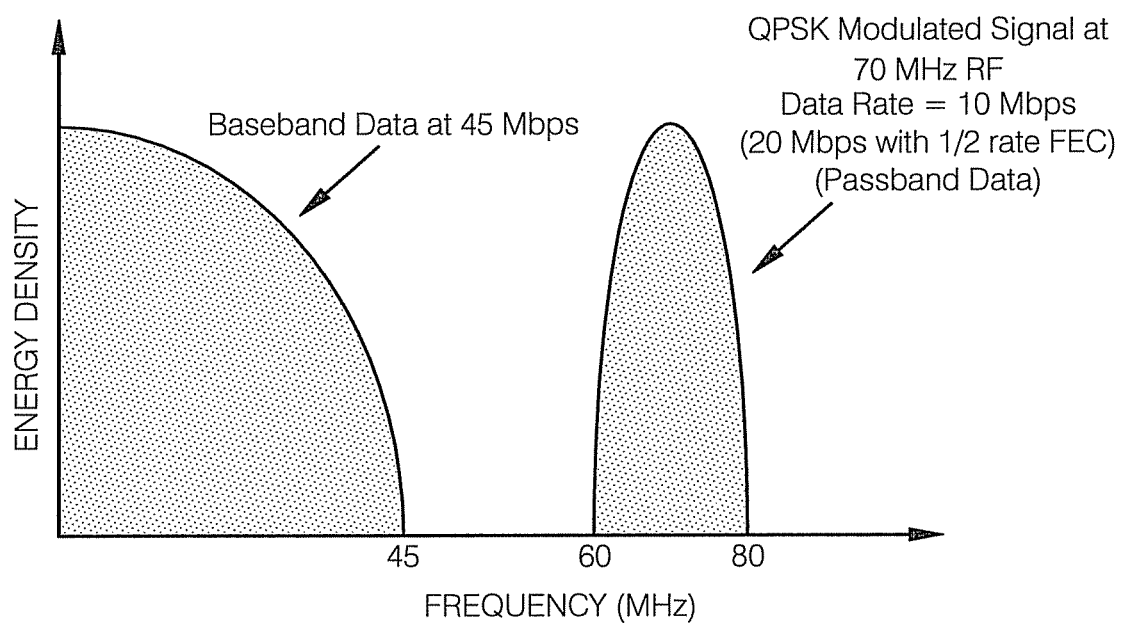
FIG. 3 is a graph showing illustrative RF spectrum of the modulated data for a full duplex FSO link for the preferred embodiment.

The RF frequencies of the QPSK signal may be higher than the data rate of the MRR terminal as shown in FIG. 3 where we assume that the data rate to be transmitted from interrogator 204 to the MRR 202 is 10 Mbps on a 70 MHz RF carrier while in the other direction the data rate is 45 Mbps in baseband. If the baseband data rate is only 10 Mbps, RF frequency can be centered at about 25 Mb/s to increase the optical receiver sensitivity. A low pass RF filter built into the receiver at the interrogator 204 can reject the RF carrier and the data sent by MRR 202 can be received without penalty.

Proof of Concept

Figure 4:
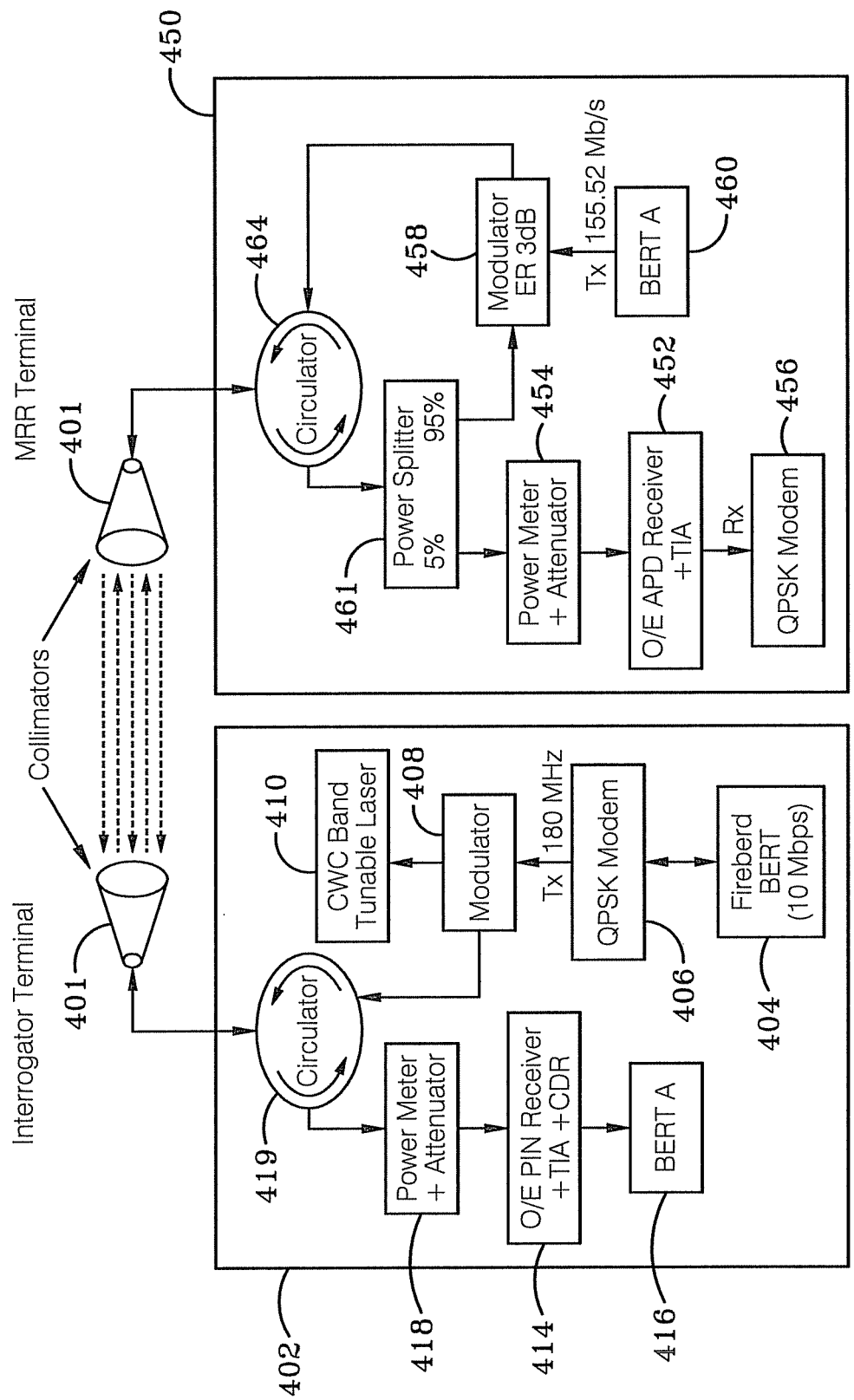
FIG. 4 is a schematic drawing of the experimental setup for a full duplex lasercomm link between simulated interrogator and the MRR terminals in the preferred embodiment.

Laboratory experiments have been performed to demonstrate the proof of existence of the proposed technology. The experiments simulate an Interrograter-MRR type link with 10 Mb/s QPSK data at 180 MHz and 155.52 Mb/s baseband data in the other direction. These high data rates were selected because of readily available equipment that supports these data rates. The experimental set up used is shown in FIG. 4 where optical collimators 401 are used for a free-space optical (FSO) link. Single mode optical fiber was used in other places. At the interrogator terminal 402, a QPSK modem 406 was used together with a Fireberd bit-error rate tester (BERT) 404 that provided 10 Mbps data to the QPSK modem 406. A LiNbO$_3$ modulator 408 was used to modulate the CW laser beam 410 with QPSK RF signal with modulation index that varied between 5% and 24%.

To simulate the MRR terminal 450 for the full duplex link, a 5% tap was used with 5% power going to a 2.5 Gb/s (1.75 GHz bandwidth) APD-TIA 452 (without CDR) receiver through an Eigenlight inline power meter 454 cum attenuator. This detected the QPSK RF transmitted signal that was presented to the QPSK modem 456 without amplification or filtering. The remaining 95% optical power was coupled to a LiNbO$_3$ modulator 458 to get re-modulated at 155.52 Mbps baseband data.

The second data signal level was adjusted to get an extinction ratio (ER) of ~3 dB. This modulator 458 was used as a substitute of MQM modulator. A 155.52 Mbps PIN receiver 414 integrated with a clock data recovery (CDR) circuit was used to receive this signal at the interrogator terminal 402.

Figure 5:
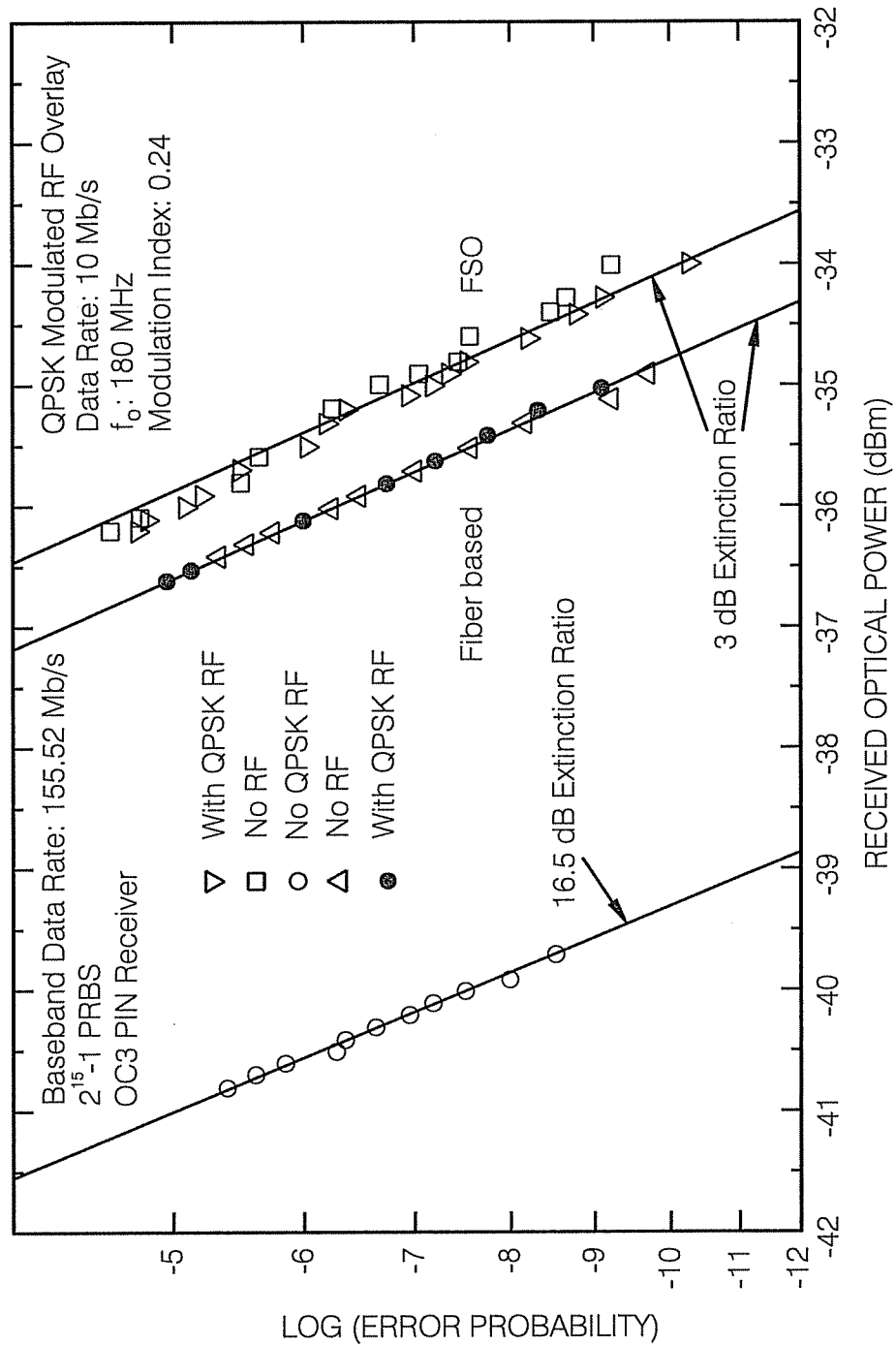
FIG. 5 is a graph showing measured BER for the baseband digital data stream of 155.52 Mb/s according to the preferred embodiment.

First, to determine a baseline and power penalty involved, the FSO link was replaced with a single mode fiber and the link was studied for bit-error rate performance. FIG. 5 illustrates that the bit-error rate (BER) for 155.52 Mbps baseband signal with and without a QPSK RF overlay for modulation index (m) as high as 24%. No power penalty is observed due to the presence of QPSK RF. However, as also shown in FIG.

5, the receiver sensitivity increased by 4.6 dB when the ER of the baseband signal was increased to an optimum value of 16.5 dB. This suggests that if there is a power penalty, it is due to low ER of 3 dB, and there is no penalty due to the prior presence of QPSK data on the optical carrier.

These measurements were repeated by reinserting the FSO link as shown in FIG. 4 and the measured BER data are also plotted in FIG. 5 with and without the presence of QPSK RF data. As before, no power penalty is observed due to the presence of QPSK RF signal. However, a penalty of ~0.7 dB was observed compared to the fiber based baseline data discussed above. This penalty could be due to experimental variations, optical wavefront distortion in the FSO link and reflections from bare fiber ends at the collimators.

The QPSK RF signal data over optical carrier is not subject to distortion or interaction with other signals and thus there is no power penalty. For a modulation index m of ~15%, and for a received optical power of −45 dBm, the measured Eb/No was ~10.5 dB and the raw BER without FEC was essentially zero, as expected theoretically. We either had loss of synchronization or error free transmission with decreasing or increasing optical power from −45 dBm, respectively. The receiver has 10× more bandwidth than necessary. The receiver sensitivity will increase by about 10 dB with an optimized bandwidth receiver. With Reed-Solomon (R-S) FEC combined with convolution decoding with Viterbi decoder FEC, the required Eb/No can decrease by 5 dB and this can increase the receiver sensitivity by another 10 dB. Then, for m ~15%, 70 MHz APD receiver and FEC, the receiver sensitivity can be <−65 dBm.

Note that the electrical signal to noise ratio of an RF subcarrier at the output of an optical receiver is related to the modulation index (m) and the received optical power ($P_{in}$) by $$SNR \approx \frac{(mP_{in})^2}{2B(n_{th}^2 + 2qPin + P_{in}^2 RIN)}$$

Where, B is the receiver bandwidth, $n_{th}$ is the receiver thermal noise presented to the preamplifier (typically 5 to 10 pA/√Hz). The second term in the denominator is the shot noise of the receiver and q is the electron charge. RIN is the transmitter relative intensity noise in dB/Hz. For modern DFB lasers, the RIN of the transmitter is insignificant compared to the thermal noise and shot noise.

From the equation for the SNR, gaining or losing 1 dB optical power is equivalent to gaining or losing 2 dB electrical SNR, if the system is thermal noise limited. For a given SNR, increasing m can reduce the needed Pin. Thus, to increase the receiver sensitivity, m needs to be kept as high as possible without introducing nonlinearities and affecting baseband data modulation.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
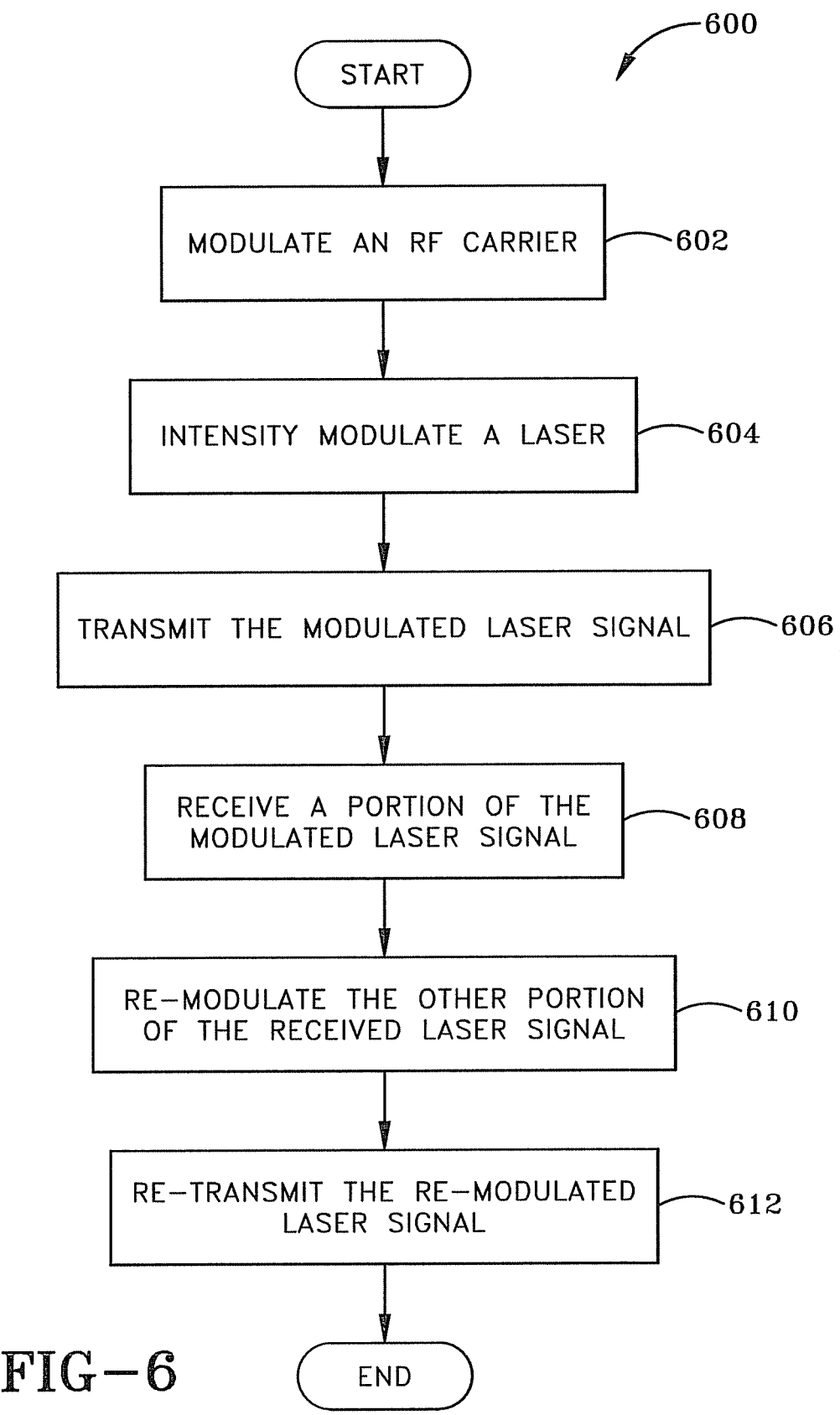
FIG. 6 is the preferred embodiment configured as a method of creating a full duplex optical link using a common laser source.

The preferred embodiment may be configured as a method 600 that is illustrated in FIG. 6. Method 600 creates a lasercomm system using a single wavelength and a free-space optical link (FSO). The method 600 modulates a first data onto an RF carrier, at 602, to produce a modulated RF carrier. The first data can be modulated onto the RF carrier using a quadrature phase-shift keying (QPSK) modulation technique or any other digital modulation technique. A laser is then intensity modulated, at 604, with the modulated RF carrier. After the laser has been modulated, it is transmitted, at 606, from an interrogator terminal to a modulating retro-reflector (MRR) terminal. In some embodiments, the modulated laser beam is transmitted with forward error correction overloads.

A portion of the laser beam is received, at 608, at a receiver at the MRR. Before the laser beam is received, an optical receiver is positioned for receiving the laser beam on the MRR. The received portion can be decoded to recover the first data. A portion of the laser beam not received at the receiver is re-modulated, at 610, with a second data to produce a re-modulated laser. This portion of the laser can be re-modulated using an on-off keying (OOK) modulation technique. The re-modulated laser is then re-transmitted back to the interrogator, at 610. The retransmitting can include reflecting the re-modulated laser back to the interrogator. The retransmitted laser can be decoded at the interrogator to recover the second data.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method of lasercomm using single wavelength, comprising:
    modulating a non-periodic first data onto a radio frequency (RF) carrier to produce a modulated RF carrier;
    intensity modulating a laser beam with the modulated RF carrier;
    transmitting the laser beam with the non-periodic first data modulated on the laser beam from an interrogator through the air to a modulating retro-reflector (MRR) terminal which is comprised of a receiver and an MRR unit, wherein the laser beam with the non-periodic first data is transmitted from the interrogator to the MRR terminal without using any fiber optic cables connecting the interrogator and the MRR terminal;
    receiving a portion of the laser beam at the receiver;
    re-modulating a portion of the laser beam received at the MRR unit with a second data to produce a re-modulated laser beam; and
    re-transmitting the re-modulated laser beam back to the interrogator.

2. The method of claim 1 further comprising:
decoding the portion of the laser beam received at the receiver to recover the non-periodic first data.

3. The method of claim 1 further comprising:
decoding the re-modulated laser at the interrogator to recover second data.

4. The method of 1 wherein the modulating a non-periodic first data onto an RF carrier further comprises:
modulate the non-periodic first data onto the RF carrier using a quadrature phase-shift keying (QPSK) modulation technique.

5. The method of 1 wherein the re-modulating the portion of the laser further comprises:
modulating the second data onto the laser beam using an on-off keying (OOK) modulation technique.

6. The method of 1 wherein the re-transmitting further comprises:
reflecting the re-modulated laser beam back to the interrogator.

7. The method of 1 wherein the transmitting the laser beam from an interrogator further comprises:
transmitting the laser with forward error correction overloads.

8. The method of 1 wherein the receiving a portion of the laser beam at the receiver further comprises:
positioning an optical receiver for receiving the laser beam on the receive module.

9. A system comprising:
a modulating retro-reflector (MRR) terminal comprising a receiver and an MRR unit;
an interrogator configured to modulate an RF signal based, at least in part, on a non-periodic first data to produce a modulated electromagnetic signal, wherein the interrogator is configured to intensity modulate a laser based, at least in part, on the modulated RF signal to produce an intensity modulated laser beam, wherein the interrogator is configured to transmit the intensity modulated laser beam with the non-periodic first data to the MRR terminal through the air; and
wherein the receiver is configured to receive the intensity modulated laser beam and to decode the received intensity modulated laser beam to extract the non-periodic first data, wherein the MRR unit is configured to modulate the intensity modulated laser beam based, at least in part, on a second data and to reflect the intensity modulated laser beam back to the interrogator.

10. The system of claim 9 wherein the interrogator is configured to extract the second data from the intensity modulated laser beam.

11. The system of claim 9 wherein the intensity modulated laser beam is a single wavelength laser beam.

12. The system of claim 9, wherein the MRR terminal further comprises:
optics configured to split the received intensity modulated laser beam into a first part and a second part, wherein the first part of the intensity modulated laser beam is received at the receiver, wherein the MMR unit is configured to modulate the second part of the intensity modulated laser beam based on the second data and to reflect the second part back to the interrogator.

13. The system of claim 12 wherein the MRR unit is configured to digitally modulate the intensity modulated laser beam based, at least in part, on the second data.

14. The system of claim 12 wherein the first part comprises signal whose level is higher than the sensitivity of the receiver so that error free data is received.

15. The system of claim 9 wherein the interrogator is configured to modulate the RF signal based, at least in part, on a quadrature phase-shift keying (QPSK) modulation technique.

16. The system of claim 9 wherein the interrogator further comprises:
optics, wherein the interrogator is configured to transmit and receive the intensity modulated laser beam to and from the MRR terminal through the optics.

17. The system of claim 9 wherein the MRR unit is configured to re-modulate the intensity modulated laser beam with second data using an on-off keying (OOK) modulation technique.

18. The system of claim 9 wherein the MRR terminal further comprises:
a multiple-quantum-well (MQW) modulator wherein the MQW modulator is configured to modulate the intensity modulated based, at least in part on the second data.

19. The system of claim 9 wherein the MRR terminal is configured to decode the non-periodic first data by performing a forward error correction on the non-periodic first data.

20. The system of claim 9 wherein the system forms a free-space optical link (FSO) between the interrogator and the MRR terminal.

* * * * *